US012385806B2

United States Patent
Nakamura et al.

(10) Patent No.: US 12,385,806 B2
(45) Date of Patent: Aug. 12, 2025

(54) POWER COUPLING COEFFICIENT MEASURING METHOD AND POWER COUPLING COEFFICIENT MEASURING DEVICE

(71) Applicant: NIPPON TELEGRAPH AND TELEPHONE CORPORATION, Tokyo (JP)

(72) Inventors: Atsushi Nakamura, Musashino (JP); Daisuke Iida, Musashino (JP); Tomokazu Oda, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 309 days.

(21) Appl. No.: 18/020,958

(22) PCT Filed: Aug. 21, 2020

(86) PCT No.: PCT/JP2020/031608
§ 371 (c)(1),
(2) Date: Feb. 13, 2023

(87) PCT Pub. No.: WO2022/038767
PCT Pub. Date: Feb. 24, 2022

(65) Prior Publication Data
US 2023/0288287 A1    Sep. 14, 2023

(51) Int. Cl.
*G01M 11/00*    (2006.01)
(52) U.S. Cl.
CPC ................ *G01M 11/31* (2013.01)
(58) Field of Classification Search
CPC .............. G01M 11/31; G01M 11/3136
See application file for complete search history.

(56) References Cited

U.S. PATENT DOCUMENTS 6,480,142 B1 * 11/2002 Rubin ................ G01S 13/951
   342/134
9,276,373 B1 * 3/2016 Pang .................... H01S 3/1062
(Continued)

FOREIGN PATENT DOCUMENTS

| CN | 118603152 A | * | 9/2024 | ............ G01D 5/353 |
| EP | 2306561 A1 | * | 4/2011 | ............ H01M 4/136 |
| JP | 2000111449 A | * | 4/2000 | ............ G01M 11/02 |

OTHER PUBLICATIONS

M. Nakazawa, M. Yoshida, and T. Hiraoka, "Nondestructive measurement of mode coupling along multi-core fiber using a synchronous multi-channel OTDR", Optics Express, vol. 20, No. 11, pp. 12530-12540, 2012.
(Continued)

*Primary Examiner* — Mohamed K Amara
(74) *Attorney, Agent, or Firm* — Harness, Dickey & Pierce, P.L.C.

(57) ABSTRACT

An object of the present disclosure is to provide a power coupling coefficient measurement method and a power coupling coefficient measurement device capable of inexpensively and easily measuring a power coupling coefficient. The power coupling coefficient measurement method according to the present disclosure is a power coupling coefficient measurement method for measuring a power coupling coefficient of a multi-core fiber in order to achieve the aforementioned object, and includes: inputting a test light pulse from one end of the multi-core fiber to any one of cores; receiving backscattered light of the core to which the test light pulse is input or any one of the other cores; measuring an intensity distribution of the backscattered light with respect to a distance from the one end of the multi-core fiber; and calculating the power coupling coefficient from the intensity distribution of the backscattered light.

6 Claims, 7 Drawing Sheets

(56) References Cited

U.S. PATENT DOCUMENTS

| | | | |
|---|---|---|---|
| 9,829,429 B2 * | 11/2017 | Cyr | G01M 11/3181 |
| 11,828,676 B2 * | 11/2023 | Nakamura | G01M 11/3145 |
| 2005/0117830 A1 * | 6/2005 | Hartog | G01M 11/319 |
| | | | 374/E11.015 |
| 2007/0054346 A1 * | 3/2007 | Nakagoshi | C12Q 1/37 |
| | | | 435/23 |
| 2007/0288105 A1 * | 12/2007 | Sekine | G05B 17/02 |
| | | | 700/52 |
| 2011/0135990 A1 * | 6/2011 | Yamamoto | H01M 4/58 |
| | | | 29/623.1 |
| 2015/0022818 A1 * | 1/2015 | Lloyd | G01C 19/721 |
| | | | 356/460 |
| 2015/0159991 A1 * | 6/2015 | Hasegawa | G01B 9/02083 |
| | | | 356/479 |
| 2018/0038769 A1 * | 2/2018 | Hayashi | G01M 11/3109 |
| 2020/0056958 A1 * | 2/2020 | Hasegawa | G01M 11/3145 |
| 2021/0353359 A1 * | 11/2021 | Cook | A61B 18/26 |

OTHER PUBLICATIONS

M. Ohashi, K. Kawazu, A. Nakamura, and Y. Miyoshi, "Simple backscattered power technique for measuring crosstalk of multi-core fibers", in Proceedings of the 17th Opto-Electronics and Communications Conference (OECC), pp. 357-358, 2012.

* cited by examiner

POWER COUPLING COEFFICIENT MEASURING METHOD AND POWER COUPLING COEFFICIENT MEASURING DEVICE

CROSS-REFERENCE TO RELATED APPLICATIONS

This application is a 371 U.S. National Phase of International Application No. PCT/JP2020/031608, filed on Aug. 21, 2020. The entire disclosure of the above application is incorporated herein by reference.

TECHNICAL FIELD

The present invention relates to a method and device for measuring a power coupling coefficient of a multi-core fiber.

BACKGROUND ART

Due to the spread of various Internet services, the amount of traffic flowing through one optical fiber has rapidly increased year by year. On the other hand, the transmission capacity that can be propagated through an optical fiber is limited, and it is predicted that a single-mode fiber (SMF), which is widely used at present, will not be able to cope with future traffic increase. In order to overcome this situation, a spatial multiplex transmission system using an optical fiber having a plurality of cores in one optical fiber (hereinafter referred to as a multi-core fiber) has been studied.

In recent years, in order to achieve both high-density spatial multiplexing and reduction in a group delay time difference between propagation modes, attention has been paid to a multi-core fiber in which modes between cores are randomly coupled by random bending or twisting in the longitudinal direction of an optical fiber (hereinafter referred to as a coupled multi-core fiber). In the coupled multi-core fiber, digital signal processing is applied on a receiving side in order to restore a transmission signal deteriorated by coupling between cores. The load of this digital signal processing is closely related to the impulse response characteristics of the coupled multi-core fiber, and the smaller the impulse response width, the smaller signal processing load. The impulse response width is determined by an inter-mode group delay time difference specific to an optical fiber and a coupling amount between modes. Therefore, a power coupling coefficient representing a degree of coupling between modes is an important characteristic, and it is important to ascertain the value thereof.

CITATION LIST

Non Patent Literature

[NPL 1] M. Nakazawa, M. Yoshida, and T. Hirooka, "Non-destructive measurement of mode coupling along multi-core fiber using a synchronous multi-channel OTDR," Optics Express, vol. 20, no. 11, pp. 12530-12540, 2012.
[NPL 2] M. Ohashi, K. Kawazu, A. Nakamura, and Y. Miyoshi, "Simple backscattered power technique for measuring crosstalk of multi-core fibers," in Proceedings of the 17th Opto-Electronics and Communications Conference (OECC), pp. 357-358, 2012.

SUMMARY OF INVENTION

Technical Problem

For example, NPL 1 and NPL 2 disclose methods of measuring a power coupling coefficient in a multi-core fiber. These methods are methods for calculating a power coupling coefficient from a ratio of backscattered light intensities in a specific core and an adjacent core when a test light pulse is input to the specific core. In these methods, two light receivers are used to simultaneously acquire backscattered light from two cores, or two measurements are required to sequentially acquire backscattered light from two cores. As a result, there is a problem that a measurement device becomes expensive or a measurement procedure becomes complicated.

In order to solve the above problem, an object of the present invention is to provide a power coupling coefficient measurement method and a power coupling coefficient measurement device capable of inexpensively and easily measuring a power coupling coefficient.

Solution to Problem

In order to achieve the above object, according to a power coupling coefficient measurement method and a power coupling coefficient measurement device according to the present invention, a power coupling coefficient is calculated from the intensity of backscattered light from a single core.

Specifically, a power coupling coefficient measurement method according to the present disclosure is a power coupling coefficient measurement method for measuring a power coupling coefficient of a multi-core fiber, and includes inputting a test light pulse from one end of the multi-core fiber to any one of cores, receiving backscattered light of the core to which the test light pulse has been input or any one of the other cores, measuring an intensity distribution of the backscattered light with respect to a distance from the one end of the multi-core fiber, and calculating a power coupling coefficient from the intensity distribution of the backscattered light.

For example, in the power coupling coefficient measurement method according to the present disclosure, calculation of the power coupling coefficient may include representing the intensity distribution in a logarithm, calculating an approximate intensity distribution of a linear expression with respect to the distance on the basis of the intensity of the backscattered light in a region where the logarithm of the intensity distribution can be approximated by the linear expression of the distance, calculating a normalized intensity distribution by normalizing the intensity distribution with the approximate intensity distribution, and calculating the power coupling coefficient from the normalized intensity distribution.

Specifically, a power coupling coefficient measurement device according to the present disclosure is a power coupling coefficient measurement device connected to one end of a multi-core fiber and measuring a power coupling coefficient of the multi-core fiber, and includes a test light pulse generator configured to generate a test light pulse, an input/output device configured to input the test light pulse generated by the test light pulse generator to any one of cores of the multi-core fiber and to output backscattered light of the core to which the test light pulse is input or any one of the other cores, a measurement device configured to measure an intensity distribution of the backscattered light output by the input/output device with respect to a distance from the one end of the multi-core fiber, and an arithmetic device configured to calculate a power coupling coefficient from the intensity distribution of the backscattered light measured by the measurement device.

For example, in the power coupling coefficient measurement device according to the present disclosure, at the time of calculating the power coupling coefficient, the arithmetic device may further perform representing the intensity distribution in a logarithm, calculating an approximate intensity distribution of a linear expression with respect to the distance on the basis of the intensity of the backscattered light in a region where the logarithm of the intensity distribution can be approximated by the linear expression of the distance, calculating a normalized intensity distribution by normalizing the intensity distribution with the approximate intensity distribution, and calculating the power coupling coefficient from the normalized intensity distribution.

Since the power coupling coefficient is calculate from the intensity of backscattered light from one core, according to the power coupling coefficient measurement method and the power coupling coefficient measurement device according to the present disclosure, a light receiver can measure the power coupling coefficient of the multi-core fiber with one measurement device and one measurement.

Accordingly, the present invention can provide a power coupling coefficient measurement method and a power coupling coefficient measurement device capable of inexpensively and easily measuring a power coupling coefficient.

The inventions described above can be combined where possible.

Advantageous Effects of Invention

According to the present disclosure, it is possible to provide a power coupling coefficient measurement method and a power coupling coefficient measurement device capable of inexpensively and easily measuring a power coupling coefficient.

DESCRIPTION OF EMBODIMENTS

Hereinafter, an embodiment of the present disclosure will be described in detail with reference to the drawings. Note that the present disclosure is not limited to the embodiment described below. These implementation examples are only illustrative, and the present disclosure can be implemented in various modified and improved modes based on the knowledge of those skilled in the art. Note that constituent elements with the same reference signs in the present description and the drawings are identical to each other.

Embodiment

Figure 1:
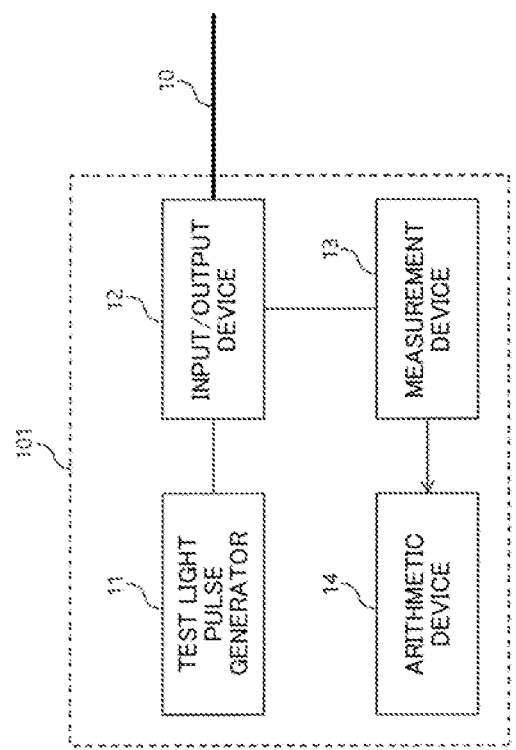
FIG. 1 shows an example of a schematic configuration and usage of a power coupling coefficient measurement device according to the present invention.

FIG. 1 shows an example of a schematic configuration of a power coupling coefficient measurement device according to the present embodiment. The power coupling coefficient measurement device 101 is a power coupling coefficient measurement device 101 that is connected to one end of a multi-core fiber 10 and measures a power coupling coefficient of the multi-core fiber 10, and includes: a test light pulse generator 11 that generates a test light pulse; an input/output device 12 that inputs the test light pulse generated by the test light pulse generator 11 to any one core of the multi-core fiber 10 and outputs backscattered light of the core to which the test light pulse is input or any other core, a measurement device 13 that measures an intensity distribution of the backscattered light output by the input/output device 12 with respect to a distance from one end of the multi-core fiber 10, and an arithmetic device 14 that calculates a power coupling coefficient from the intensity distribution of the backscattered light measured by the measurement device 13.

Figure 2:
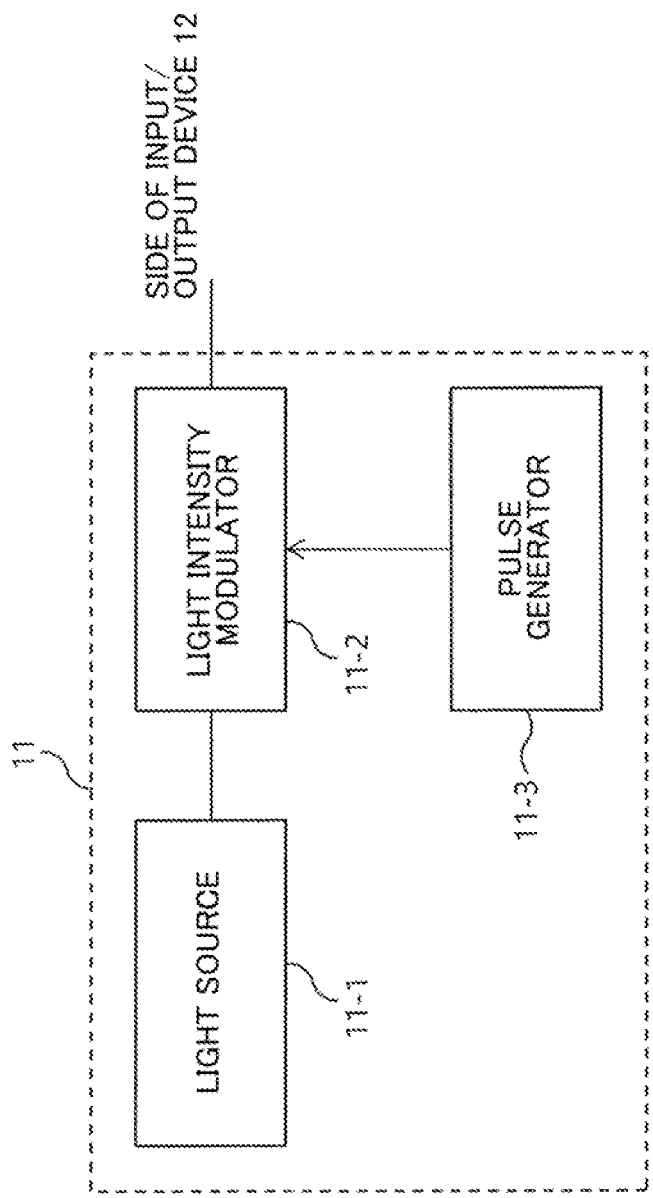
FIG. 2 shows an example of a schematic configuration and usage of the power coupling coefficient measurement device according to the present invention.

An example of the configuration of the power coupling coefficient measurement device according to the present embodiment will be specifically described with reference to FIG. 2 to FIG. 4. FIG. 2 is a diagram illustrating an example of the test light pulse generator 11. The test light pulse generator 11 includes a light source 11-1, a light intensity modulator 11-2, and a pulse generator 11-3.

The light source 11-1 outputs continuous light of a wavelength to be used as test light.

The pulse generator 11-3 sends a pulse signal to the light intensity modulator 11-2. Further, the pulse generator 11-3 may output a trigger signal for determining a timing at which measurement of an intensity distribution of backscattered light is started to the measurement device 13.

The light intensity modulator 11-2 pulses the continuous light output from the light source 11-1 according to the signal of the pulse generator 11-3 to form a test light pulse. The light intensity modulator 11-2 may be, for example, an acousto-optic modulator including an acousto-optic switch for pulse-driving an acousto-optic element.

Figure 3:
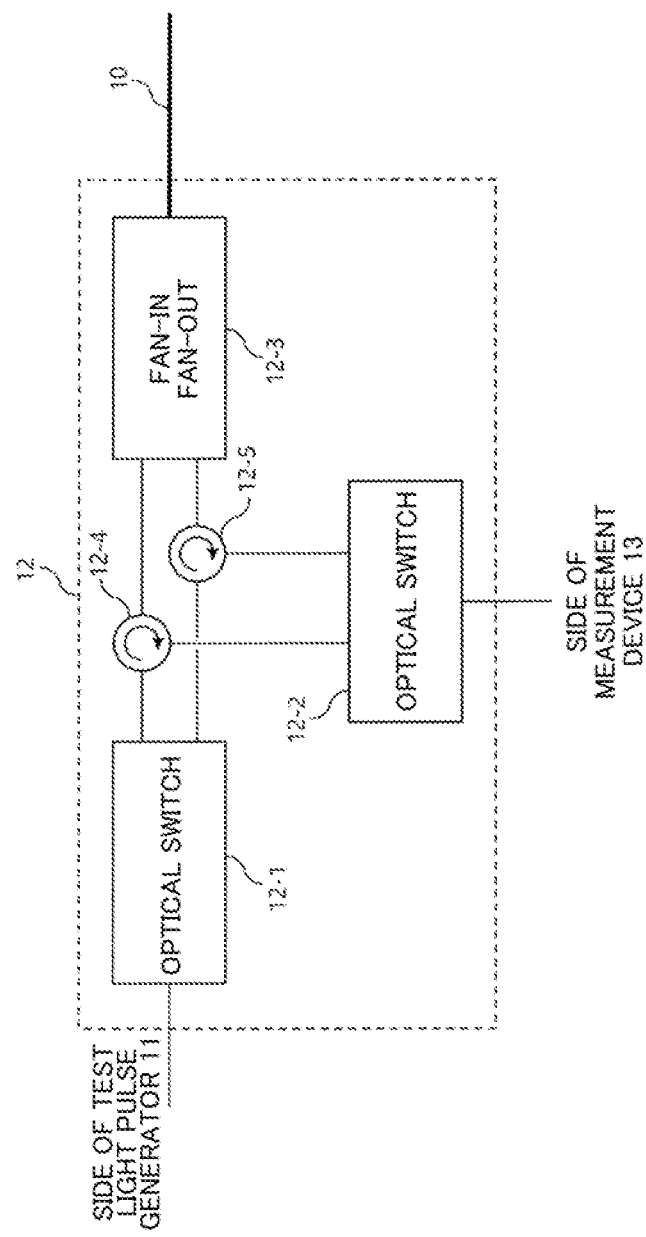
FIG. 3 shows an example of a schematic configuration and usage of the power coupling coefficient measurement device according to the present invention.

FIG. 3 is a diagram illustrating the input/output device 12. The input/output device 12 includes optical switches 12-1 and 12-2, a fan-in fan-out 12-3, and optical circulators 12-4 and 12-5.

The optical switch 12-1 is connected to the light intensity modulator 11-2 through a single core fiber and switches an optical path according to a core of the multi-core fiber 10 to which the test light pulse is input. The optical switch 12-2 switches an optical path according to a core of the multi-core fiber 10 that measures backscattered light.

As shown in FIG. 3, the optical circulators 12-4 and 12-5 are inserted between the optical switches 12-1 and 12-2 and the fan-in fan-out 12-3 and control a propagation direction of light.

The fan-in fan-out 12-3 is used to couple each core of the multi-core fiber 10 and a single core fiber from the optical circulators 12-4 and 12-5.

Figure 4:
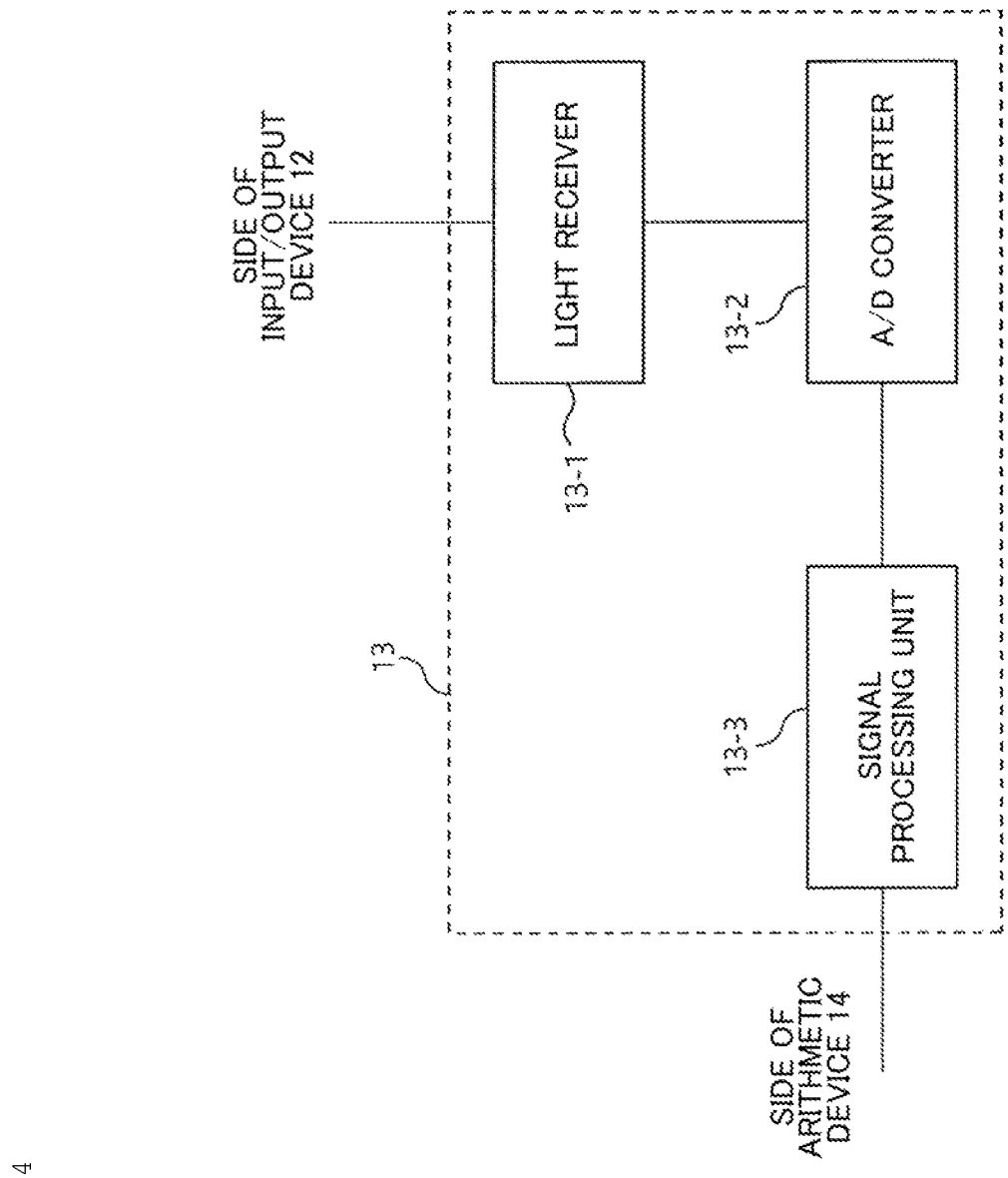
FIG. 4 shows an example of a schematic configuration and usage of the power coupling coefficient measurement device according to the present invention.

FIG. 4 is a diagram illustrating the measurement device 13. The measurement device 13 includes a light receiver 13-1, an analog/digital (A/D) converter 13-2, and a signal processing unit 13-3.

The light receiver 13-1 is connected to the optical switch 12-2 through a single core fiber and receives backscattered light generated in the multi-core fiber 10 via the fan-in fan-out 12-3, the optical circulator 12-4 or 12-5, and the optical switch 12-2.

The A/D converter 13-2 converts an electrical signal from the light receiver 13-1 into digital data. The A/D converter 13-2 inputs the digital data to the signal processing unit 13-3.

The signal processing unit 13-3 acquires the intensity distribution of the backscattered light from the input digital data.

The arithmetic device 14 performs arithmetic processing for calculating a power coupling coefficient from the intensity distribution of the backscattered light acquired by the signal processing unit 13-3. The arithmetic device 14 may further perform representing the intensity distribution by a logarithm, calculating an approximate intensity distribution of a linear expression with respect to a distance on the basis of the intensity of backscattered light in a region where the logarithm of the intensity distribution can be approximated by the linear expression of the distance, calculating a normalized intensity distribution by normalizing the intensity distribution with the approximate intensity distribution, and calculating a power coupling coefficient from the normalized intensity distribution at the time of calculating the power coupling coefficient. The content of processing performed by the arithmetic device 14 corresponds to step S04 of a power coupling coefficient measurement method which will be described later. The details of the content of processing performed by the arithmetic device 14 will be described through the power coupling coefficient measurement method as step S04 of the power coupling coefficient measurement method.

Note that the signal processing unit 13-3 and the arithmetic device 14 can also be realized by a computer and a program, and the program can be recorded in a recording medium and can also be provided through a network.

Figure 5:
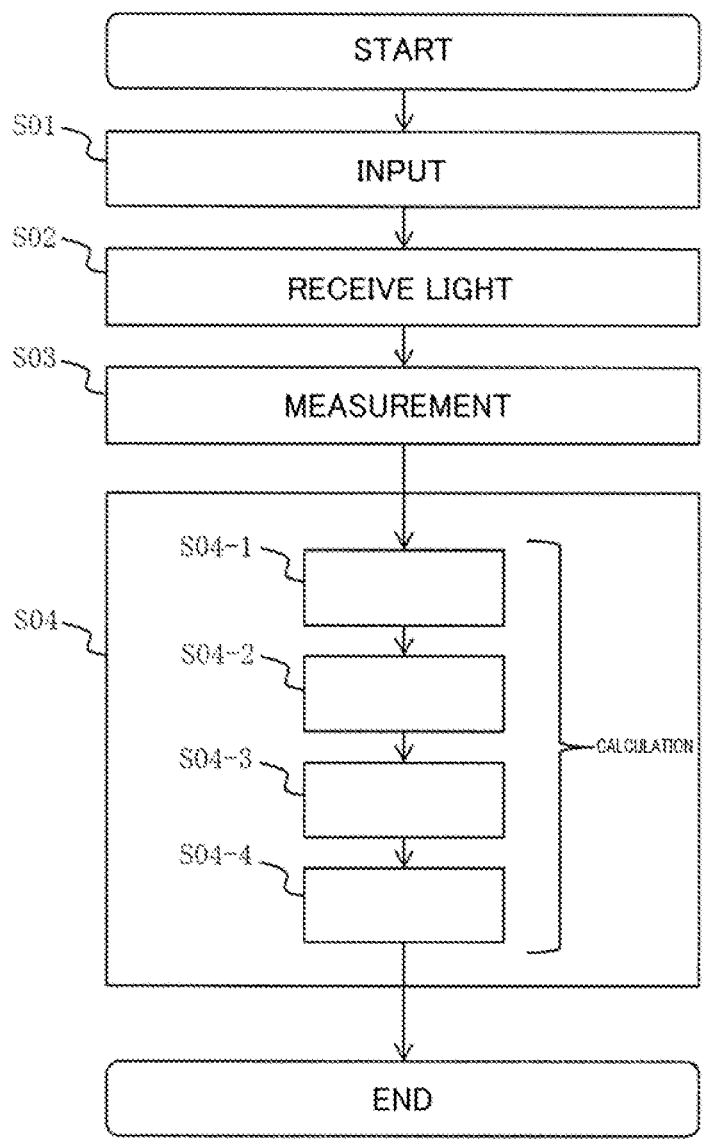
FIG. 5 shows an example of a flowchart of a power coupling coefficient measurement method according to the present invention.

FIG. 5 shows a flowchart of the power coupling coefficient measurement method according to the present embodiment. The power coupling coefficient measurement method is a power coupling coefficient measurement method for measuring the power coupling coefficient of the multi-core fiber 10 and includes: an input step S01 of inputting a test light pulse from one of the multi-core fiber 10 to any one core; a light receiving step S02 of receiving backscattered light of the core to which the test light pulse is input or any other core; a measurement step S03 of measuring an intensity distribution of the backscattered light with respect to the distance from one end of the multi-core fiber 10, and a calculation step S04 of calculating a power coupling coefficient from the intensity distribution of the backscattered light. Hereinafter, steps S01 to S04 will be described in detail.

(Step S01)

As described above, the test light pulse generator 11 converts continuous light output from the light source 11-1 into a test light pulse and inputs the test light pulse to the multi-core fiber 10 via the input/output device 12.

(Step S02)

As described above, the measurement device 13 receives backscattered light generated in the multi-core fiber 10 through the input/output device 12.

(Step S03)

The measurement device 13 acquires the intensity distribution of the received backscattered light through the signal processing unit 13-3.

(Step S04)

The arithmetic device 14 calculates a power coupling coefficient from the intensity distribution of the backscattered light acquired by the signal processing unit 13-3. Calculation of the power coupling coefficient may further include: a sub-step S04-1 of representing the intensity distribution by a logarithm; a sub-step S04-2 of calculating an approximate intensity distribution of a linear expression with respect to a distance on the basis of the intensity of the backscattered light in a region where the logarithm of the intensity distribution can be approximated by the linear expression of the distance; a sub-step S04-3 of calculating a normalized intensity distribution by normalizing the intensity distribution by the approximate intensity distribution; and a sub-step S04-4 of calculating the power coupling coefficient from the normalized intensity distribution.

Sub-steps S04-1 to S04-4 in this step will be described in detail with reference to FIG. 6 and FIG. 7. Hereinafter, calculation of a power coupling coefficient will be described with reference to a multi-core fiber having two cores as an example. The two cores are referred to as core 1 and core 2. It is assumed that the cores have the same loss coefficient α, Rayleigh scattering coefficient as, and backscattered light capture rate B, and the power coupling coefficient h can be regarded as being uniform in the longitudinal direction. The distance from the end face of an optical fiber to be tested to which test light pulse is input is represented by z. Further, the intensity of the test light pulse input from one end of the multi-core fiber 10 is set to $P_0$.

Sub-step S04-1 and S04-2 will be described. In input step S01, a case of inputting a test light pulse to core 1 is conceived. At this time, the intensity distribution of backscattered light of each core can be expressed by formula 1 for core 1 and formula 2 for core 2.

[Math. 1]

$$P_{bs1}(z) = \frac{P_0}{2}\alpha_s B\exp(-2\alpha z)[1 + \exp(-4hz)] \quad (1)$$

[Math. 2]

$$P_{bs2}(z) = \frac{P_0}{2}\alpha_s B\exp(-2\alpha z)[1 - \exp(-4hz)] \quad (2)$$

Note that $P_{bs1}(z)$ and $P_{bs2}(z)$ represent intensity distributions of backscattered light in core 1 and core 2.

Here, when the product of the power coupling coefficient h and the distance z sufficiently increases, both $P_{bs1}(z)$ and $P_{bs2}(z)$ converge to $P_{conv}(z)$ represented by formula 3.

[Math. 3]

$$P_{conv}(z) = \frac{P_G}{2}\alpha_s B\exp(-2\alpha z) \quad (3)$$

$P_{conv}(z)$ is called an approximate intensity distribution.

Figure 6:
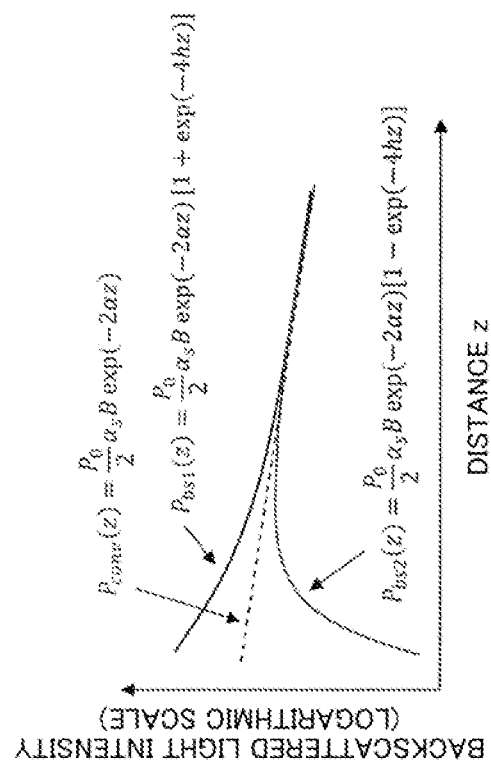
FIG. 6 is a diagram illustrating the power coupling coefficient measurement method according to the present invention.

The intensity distributions $P_{bs1}(z)$ and $P_{bs2}(z)$ and the approximate intensity distribution $P_{conv}(z)$ are shown in FIG. 6 with the ordinate axis as a logarithmic scale. In the logarithmic scale, $P_{bs1}(z)$ or $P_{bs2}(z)$ are curved lines and $P_{conv}(z)$ is a straight line. Further, when the distance z increases, $P_{bs1}(z)$ and $P_{bs2}(z)$ approach the straight line of $P_{conv}(z)$ and converge thereon. Furthermore, $P_{conv}(z)$ does not depend on a core whose intensity distribution has been measured.

Therefore, in this step, when the relationship between the intensity distribution $P_{bs1}(z)$ or $P_{bs2}(z)$ and the approximate intensity distribution $P_{conv}(z)$ that is, the distance z increases, $P_{bs1}(z)$ and $P_{bs2}(z)$ of the logarithmic scale converge on the same straight line, and the fact that the straight line is $P_{conv}(z)$ is used. In sub-step S04-1, the intensity distribution $P_{bs1}(z)$ or $P_{bs2}(z)$ is represented on a logarithmic scale in order to facilitate extraction of a straight line part which becomes the approximate intensity distribution $P_{conv}(z)$ from the measured intensity distribution $P_{bs1}(z)$ or $P_{bs2}(z)$.

In sub-step S04-2, first, the arithmetic device 14 obtains a ratio of change for two distances z in the vicinity of an end (hereinafter abbreviated as "other end") on the opposite side to the end on which an input pulse is incident with respect to the intensity distribution $P_{bs1}(z)$ or $P_{bs2}(z)$ which is represented on the logarithmic scale. Here, the ratio of change is expressed as $\Delta P_{bsi} \div \Delta z$ where $\Delta z$ is a difference between the two distances $z_\alpha$ and $z_\beta$, and $\Delta P_{bsi}$ is a difference between the intensities of a core i on the logarithmic scale corresponding to $\Delta z$. Further, the difference $\Delta P_{bsi}$ between the intensities of the core i on the logarithmic scale corresponding to $\Delta z$ is $\Delta P_{bsi} = (\log_{10}[P_{bsi}(z_\alpha)] - \log_{10}[P_{bsi}(z_\beta)])$ using the intensities $P_{bsi}(z_\alpha)$ and $P_{bsi}(z_\beta)$ corresponding to the distances $z_\alpha$ and $z_\beta$. Further, the vicinity of the other end may be a point separated by 1 km or more from the end on which the input pulse is incident, for example, if it is a coupling type multi-core fiber.

Then, the arithmetic device 14 extracts a region in which the ratio of change for two distances is regarded as almost the same as a ratio of change in the vicinity of the other end which has already been obtained even if the two distances z in the intensity distribution $P_{bs1}(z)$ or $P_{bs2}(z)$ represented on the logarithmic scale are taken. The arithmetic device 14 linearly approximates measured data of the intensities constituting the intensity distribution of the extracted region using the least square method and represents the measured data by a linear expression of the distance z. Since the linear expression of the distance z is the approximate intensity distribution $P_{conv}(z)$ on the logarithmic scale, $P_{conv}(z)$ is obtained by returning the linear expression of the distance z from the logarithmic scale to the original one.

Sub-step S04-3 will be described. In sub-step S04-3, the measured intensity distribution $P_{bs1}(z)$ or $P_{bs2}(z)$ is divided by the approximate intensity distribution $P_{conv}(z)$ obtained in sub-step S04-2 to obtain a normalized intensity distribution $P_{bsi}(Z) \div P_{conv}(z)$ of core 1 or core 2.

The advantage of using the normalized intensity distribution will be described. As described above, in a case where Math. 1 and Math. 2 are established for the intensity distributions $P_{bs1}(z)$ and $P_{bs2}(z)$, when the distance z increases, the intensity distributions converge on the same approximate intensity distribution $P_{conv}(z)$ regardless of the core. Then, the intensity distributions $P_{bs1}(z)$ and $P_{bs2}(z)$ are normalized by the approximate intensity distribution $P_{conv}(z)$. The normalized intensity distributions $P_{bs1}(z)$ and $P_{bs2}(z)$ are represented by Math. 4 and Math. 5. The left side of Math. 4 is a normalized intensity distribution of core 1, and the left side of Math. 5 is a normalized intensity distribution of core 2.

[Math. 4]

$$\frac{P_{bs1}(z)}{P_{conv}(z)} = 1 + \exp(-4hz) \quad (4)$$

[Math. 5]

$$\frac{P_{bs2}(z)}{P_{conv}(z)} = 1 - \exp(-4hz) \quad (5)$$

As represented by Math. 4 and Math. 5, the loss coefficient $\alpha$, the Rayleigh scattering coefficient $\alpha_s$, the backscattered light capture rate B, and the intensity $P_0$ of the test light pulse of each core which are parameters of intensity do not appear in the normalized intensity distribution. Accordingly, when the normalized intensity distribution is used, the power coupling coefficient h can be easily obtained without determining these parameters.

Figure 7:
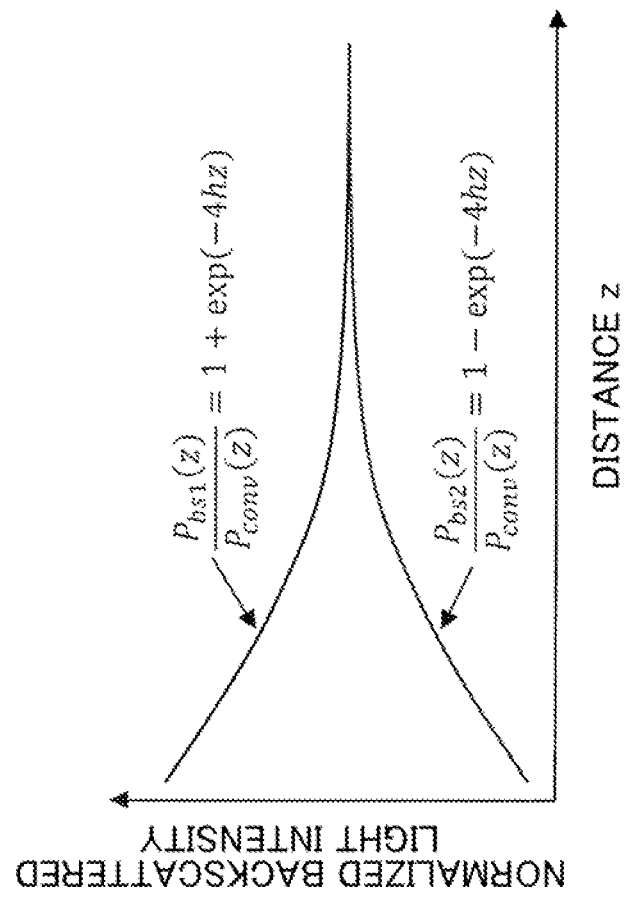
FIG. 7 is a diagram illustrating the power coupling coefficient measurement method according to the present invention.

FIG. 7 shows the normalized intensity distributions of Math. 4 and Math. 5. As shown in FIG. 7, the normalized intensity distributions of core 1 and core 2 converge on 1 as the product of the power coupling coefficient h and the distance z increases.

Sub-step S04-4 will be described. Math. 6 and Math. 7 are obtained by solving Math. 4 and Math. 5 with respect to the power coupling coefficient h.

[Math. 6]

$$h = -\frac{1}{4z}\ln\left(\frac{P_{bs1}(z)}{P_{conv}(z)} - 1\right) \quad (6)$$

[Math. 7]

$$h = -\frac{1}{4z}\ln\left(1 - \frac{P_{bs2}(z)}{P_{conv}(z)}\right) \quad (7)$$

According to Math. 6 and Math. 7, if the normalized intensity distribution of core 1 or core 2 is obtained, the power coupling coefficient h in the region until the normalized intensity distribution converges on 1 can be obtained.

Therefore, in sub-step S04-4, Math. 6 or Math. 7 is used. Specifically, the power coupling coefficient h is obtained by inserting the obtained normalized intensity distribution into Math. 6 or Math. 7.

Further, the power coupling coefficient h may be obtained using the following method. Hereinafter, the intensity measured at a distance $z_\alpha$ farther than a predetermined distance $z_1$ among the measured intensities is set to $P_{bs1}(z_a|z_a>z_1)$ or $P_{bs2}(z_a|z_a>z_1)$. For example, $z_\alpha$ may be a distance of 1 km or more from the end on which the input pulse is incident in the case of a coupling type multi-core fiber. A plurality of distances $z_\alpha$ are prepared, and the intensity $P_{bs1}(z_a|z_a>z_1)$ or $P_{bs2}(z_a|z_a>z_1)$ measured at each distance $z_\alpha$ is linearly approximated using the least square method. The distribution obtained by linear approximation is assumed to be an approximate intensity distribution $P_{conv}(z)$. An intensity is measured at an arbitrary distance $z_m$ to obtain an intensity $P_{bsi}(z_m)$ or $P_{bs2}(z_m)$. Further, the measured distance $z_m$ is inserted into the approximate intensity distribution $P_{conv}(z)$ to obtain an approximate intensity $P_{conv}(z_m)$. The measured intensity $P_{bsi}(z_m)$ or $P_{bs2}(z_m)$ for the approximate intensity $P_{conv}(z_m)$ is obtained as a normalized intensity. The obtained normalized intensity is inserted into Math. 6 or Math. 7 to obtain a power coupling coefficient h.

Although the multi-core fiber having two cores has been described as an example, the same concept can be applied to a multi-core fiber having three or more cores.

As described above, since the power coupling coefficient measurement method and the power coupling coefficient measurement device according to the present disclosure calculate a power coupling coefficient from a backscattered light intensity from one core, the receiver can measure the power coupling coefficient of the multi-core fiber with one measurement device and one measurement.

Therefore, according to the present invention, it is possible to provide a power coupling coefficient measurement method and a power coupling coefficient measurement device capable of inexpensively and easily measuring a power coupling coefficient.

In addition, when backscattered light of the same core as an input core is measured, it is desirable to access only a measurement target core, and thus measurement can be performed only by fusion splicing a general-purpose single-core single-mode fiber without using fan-in fan-out.

However, in the case of measuring the same core as the above-described input core, there is a case where a region (dead zone) in which change in backscattered light due to Fresnel reflection occurring in components such as fan-in fan-out cannot be measured at the time of inputting an optical pulse is generated. On the other hand, when a core different from the input core is measured, measurement can be performed while avoiding Fresnel reflection, and thus measurement can be performed without generating a dead zone. Since the coupled multi-core fiber has a large power coupling coefficient and a normalized backscattered light intensity may converge on 1 at a distance of several tens of meters or less, it can be an important effect that measurement can be performed without a dead zone.

The inventions described above can be combined as much as possible.

INDUSTRIAL APPLICABILITY

The power coupling coefficient measurement method and the power coupling coefficient measurement device according to the present disclosure can be applied to information communication industry.

REFERENCE SIGNS LIST

10 Multi-core fiber
11 Test light pulse generator
11-1 Light source
11-2 Light Intensity modulator
11-3 Pulse generator
12 Input/output device
12-1 Optical switch
12-2 Optical switch
12-3 Fan-in fan-out
12-4 Optical circulator
12-5 Optical circulator
13 Measurement device
13-1 Light receiver
13-2 A/D converter
13-3 Signal processing unit
14 Arithmetic device
101 Power coupling coefficient measurement device

The invention claimed is:

1. A power coupling coefficient measurement method for measuring a power coupling coefficient of a multi-core fiber, comprising:
inputting a test light pulse from one end of the multi-core fiber to any one of cores;
receiving backscattered light of the core to which the test light pulse has been input or any one of the other cores;
measuring an intensity distribution of the backscattered light with respect to a distance from the one end of the multi-core fiber; and
calculating a power coupling coefficient from the intensity distribution of the backscattered light,
wherein the calculating of the power coupling coefficient further includes:
representing the intensity distribution in a logarithm;
calculating an approximate intensity distribution of a linear expression with respect to the distance on the basis of the intensity of the backscattered light in a region where the logarithm of the intensity distribution can be approximated by the linear expression of the distance;
calculating a normalized intensity distribution by normalizing the intensity distribution with the approximate intensity distribution; and
calculating the power coupling coefficient from the normalized intensity distribution.

2. The power coupling coefficient measurement method of claim 1, wherein the calculating the power coupling coefficient includes calculating the power coupling coefficient using the equation:

$$h = -\tfrac{1}{4}z * \ln((P_{bs1}(z)/P_{conv}(z))-1),$$

where h is the power coupling coefficient, ln represents natural log, and $P_{bs1}(z)$ is the normalized intensity distribution for the core to which the test light pulse is input and $P_{conv}(z)$ is the approximate intensity distribution.

3. The power coupling coefficient measurement method of claim 1, wherein the calculating the power coupling coefficient includes calculating the power coupling coefficient using the equation:

$$h = -\tfrac{1}{4}z * \ln(1-(P_{bs2}(z)/P_{conv}(z))),$$

where h is the power coupling coefficient, ln represents natural log, and $P_{bs2}(z)$ is the normalized intensity distribution for any one of the other cores to which the test light pulse is not input and $P_{conv}(z)$ is the approximate intensity distribution.

4. The power coupling coefficient measurement method of claim 1, wherein the arithmetic device calculates the power coupling coefficient by using the equation:

$$h = -\tfrac{1}{4}z * \ln(1-(P_{bs2}(z)/P_{conv}(z))),$$

where h is the power coupling coefficient, ln represents natural log, and $P_{bs2}(z)$ is the normalized intensity distribution for any one of the other cores to which the test light pulse is not input and $P_{conv}(z)$ is the approximate intensity distribution.

5. A power coupling coefficient measurement device connected to one end of a multi-core fiber and measuring a power coupling coefficient of the multi-core fiber, comprising:
a test light pulse generator configured to generate a test light pulse;
an input/output device configured to input the test light pulse generated by the test light pulse generator to any one of cores of the multi-core fiber and to output backscattered light of the core to which the test light pulse is input or any one of the other cores;
a measurement device configured to measure an intensity distribution of the backscattered light output by the input/output device with respect to a distance from the one end of the multi-core fiber; and an arithmetic device configured to calculate a power coupling coefficient from the intensity distribution of the backscattered light measured by the measurement device, wherein, the arithmetic device calculates the power coupling coefficient by:

representing the intensity distribution in a logarithm, calculating an approximate intensity distribution of a linear expression with respect to the distance on the basis of the intensity of the backscattered light in a region where the logarithm of the intensity distribution can be approximated by the linear expression of the distance, calculating a normalized intensity distribution by normalizing the intensity distribution with the approximate intensity distribution, and calculating the power coupling coefficient from the normalized intensity distribution.

6. The power coupling coefficient measurement device of claim 5, wherein the arithmetic device calculates the power coupling coefficient by using the equation:

$$h = -\frac{1}{4z} * \ln((P_{bs1}(z)/P_{conv}(z)) - 1),$$

where h is the power coupling coefficient, ln represents natural log, and $P_{bs1}(z)$ is the normalized intensity distribution for the core to which the test light pulse is input and $P_{conv}(z)$ is the approximate intensity distribution.

* * * * *